(12) United States Patent
Cheng et al.

(10) Patent No.: US 7,082,036 B2
(45) Date of Patent: Jul. 25, 2006

(54) BEZEL MOUNTING ASSEMBLY

(75) Inventors: Cheng-Lung Cheng, Tu-cheng (TW); Shu-Gang Shi, Shenzhen (CN); Ying-Tong Yang, Shenzhen (CN); Zhe Zhang, Shenzhen (CN)

(73) Assignee: Hon Hai Precision Industry Co., Ltd., Taipei Hsien (TW)

( * ) Notice: Subject to any disclaimer, the term of this patent is extended or adjusted under 35 U.S.C. 154(b) by 0 days.

(21) Appl. No.: 11/066,057

(22) Filed: Feb. 25, 2005

(65) Prior Publication Data
US 2005/0207111 A1    Sep. 22, 2005

(30) Foreign Application Priority Data
Mar. 20, 2004    (CN) ................... 2004 2 0043936 U (51) Int. Cl.
*H05K 7/16* (2006.01)
*A47B 97/00* (2006.01)
*A47G 29/00* (2006.01)
*E05C 19/06* (2006.01)
*H05K 5/03* (2006.01)

(52) U.S. Cl. ................ 361/726; 312/223.2; 312/265.5; 292/19; 292/91; 361/683

(58) Field of Classification Search ................ 361/726
See application file for complete search history.

(56) References Cited

U.S. PATENT DOCUMENTS

| | | | | |
|---|---|---|---|---|
| 5,116,261 A | * | 5/1992 | Lan et al. .................... | 312/292 |
| 5,123,680 A | | 6/1992 | Liu | |
| 5,825,626 A | * | 10/1998 | Hulick et al. ................ | 361/724 |
| 5,997,115 A | * | 12/1999 | Radloff et al. ............... | 312/222 |
| 6,209,975 B1 | * | 4/2001 | Lai .......................... | 312/223.2 |
| 6,234,593 B1 | * | 5/2001 | Chen et al. ................ | 312/223.2 |
| 6,297,948 B1 | * | 10/2001 | Buican et al. ................ | 361/683 |
| 6,373,690 B1 | * | 4/2002 | Buican et al. ............... | 361/683 |
| 6,375,287 B1 | * | 4/2002 | Lai .......................... | 312/223.2 |
| 6,899,407 B1 | * | 5/2005 | Lai .......................... | 312/223.2 |
| 6,906,927 B1 | * | 6/2005 | Su ............................ | 361/727 |
| 2005/0040744 A1 | * | 2/2005 | Chen et al. ................ | 312/265.6 |
| 2005/0046316 A1 | * | 3/2005 | Chen et al. ................ | 312/223.2 |
| 2005/0057127 A1 | * | 3/2005 | Chen et al. ................ | 312/223.2 |
| 2005/0062374 A1 | * | 3/2005 | Chen et al. ................ | 312/223.2 |

FOREIGN PATENT DOCUMENTS

| | | |
|---|---|---|
| TW | 200980 | 2/1993 |
| TW | 285315 | 9/1996 |

* cited by examiner

*Primary Examiner*—Lisa Lea-Edmonds
*Assistant Examiner*—Zachary Pape
(74) *Attorney, Agent, or Firm*—Tim Tingkang Xia, Esq.; Morris, Manning & Mart (57) ABSTRACT

A bezel mounting assembly includes a bezel (10), a front panel (30), and a latch (50). The bezel includes a pair of first catches (111) extending therefrom. The front panel includes a pair of first slots (35). The latch includes a pair of second slots (55) and a pair of tabs (551) extending from an edge of the second slots. A resilient member (70) attaches the latch to the front panel. When the bezel is attached to the front panel, the first catches are extended through the first and the second slots to engage with the second tabs. Simultaneity, the latch is moved with the catches abutting and applying a pushing force on the second tabs. The catches ride over and engage with the second tabs. Thus the bezel is secured to the front panel.

17 Claims, 8 Drawing Sheets

BEZEL MOUNTING ASSEMBLY

BACKGROUND OF THE INVENTION

1. Field of the Invention

The present invention relates to a mounting assembly, and more particularly to a computer bezel mounting assembly with a convenient and liable usability.

2. Prior Art

A conventional front bezel is mounted to a computer case by means of a plurality of set screws or fasteners being attached to the bezel and engaged in a plurality of fixing holes defined in the computer case. A typical bezel mounting assembly is disclosed in Taiwan Patent Publication No. 285,315. The mounting assembly comprises a chassis and a front bezel. Two sidewalls of the chassis define a plurality of receiving slots in respective front portions thereof. Side edges of the bezel have a plurality of barbs engaging in the corresponding slots of the chassis, thereby connecting the front bezel to the chassis. However, this mounting assembly requires the bezel to have numerous barbs, which makes detachment of the bezel from the chassis inconvenient and laborious. Additionally, the barbs are easily broken when too much force is applied thereon during the detachment process.

Another typical bezel mounting assembly is disclosed in Taiwan Patent Publication No. 200,980. The bezel mounting assembly comprises a front bezel, a chassis and a plurality of metal clip members mounted on top of corresponding pillars formed on the bezel. A circumferential edge of the chassis defines a plurality of slots corresponding to the arrangement of the pillars. Each metal clip comprises a planar fixing portion, a vertical supporting portion, and a guiding portion. A mounting dent is defined between the supporting portion and the guiding portion. The guiding portion passes through the corresponding slot of the chassis until an inner edge of the chassis at the slot is blocked in the mounting dent. The bezel is thereby mounted to the chassis. This mounting assembly requires a plurality of additional separate members (i.e., the metal clips) with specific configurations in order to mount the bezel, which makes manufacturing of the mounting assembly more time-consuming costly. Moreover, it is rather inconvenient and laborious to detach all the clips members tightly engaged in the slots. Another similar structure is also disclosed in U.S. Pat. No. 5,123,680. Furthermore, attaching the bezel to chassis and detaching the bezel from the chassis are completed outside the chassis. An unexpected detachment maybe happened.

SUMMARY OF THE INVENTION

Accordingly, an object of the present invention is to provide a bezel mounting assembly with a convenient and liable usability.

To achieve the above object, a bezel mounting assembly of the present invention includes a bezel, a front panel, and a latch. The bezel includes a pair of first catches extending therefrom. The front panel includes a pair of first slots. The latch includes a pair of second slots and a pair of tabs extending from an edge of the second slots. A resilient member attaches the latch to the front panel. When the bezel is attached to the front panel, the first catches are extended through the first and the second slots to engage with the second tabs. Simultaneity, the latch is moved with the catches abutting and applying a pushing force on the second tabs. The catches ride over and engage with the second tabs. Thus the bezel is secured to the front panel.

Other objects, advantages and novel features of the present invention will be drawn from the following detailed description of a preferred embodiment of the present invention with the attached drawings, in which:

DETAILED DESCRIPTION OF THE INVENTION

Figure 1:
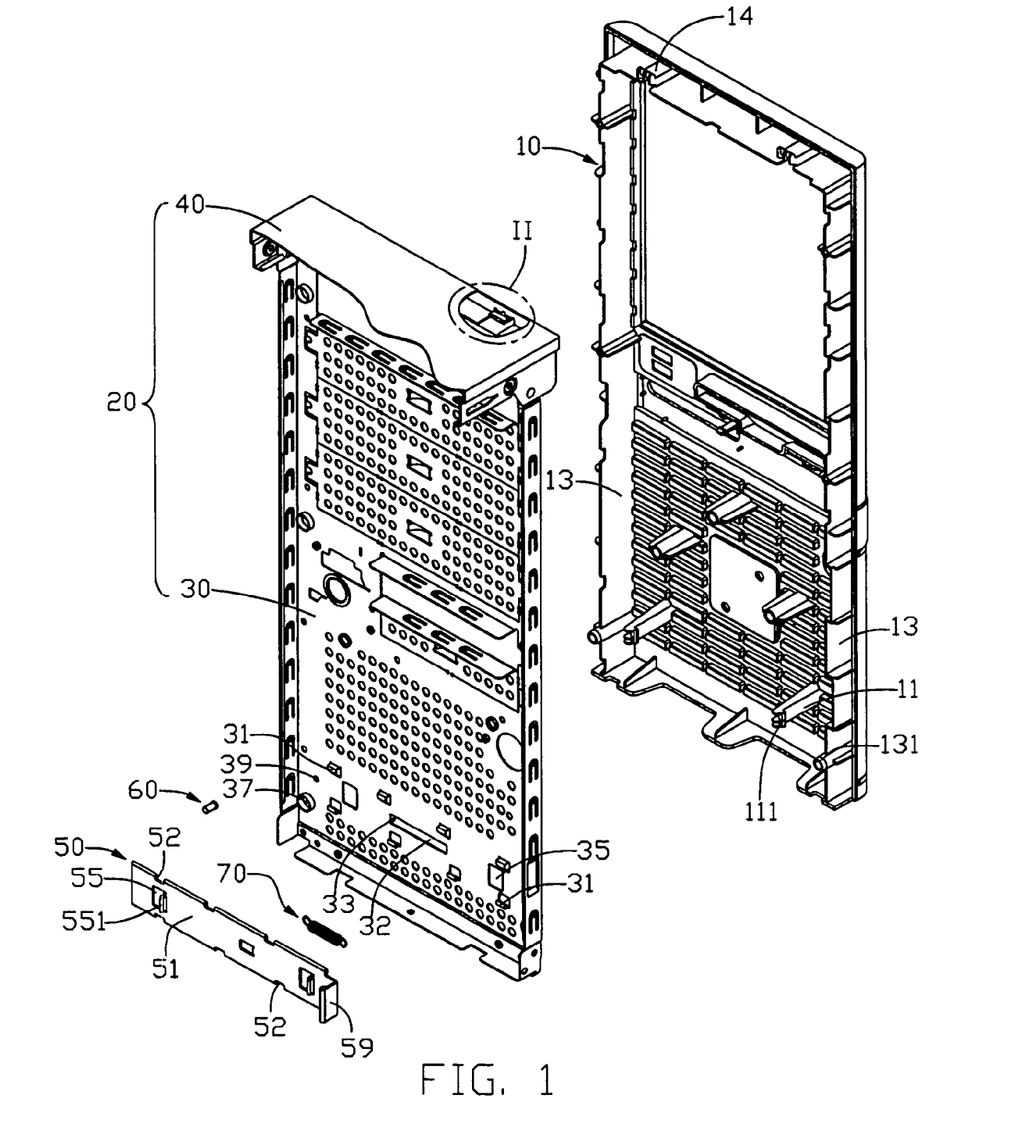
FIG. 1 is an exploded, isometric view of a bezel mounting assembly in accordance with the present invention, the bezel mounting assembly comprising a bezel, a latch and a chassis with a front panel.

Referring to FIG. 1, a bezel mounting assembly of a chassis of an electronic device in accordance with a preferred embodiment of the present invention comprises a bezel 10, a front panel 30 of a computer chassis 20, a latch 50, a locator 60, and a resilient member 70.

The bezel 10 is generally rectangular configuration. A pair of arms 11 inwardly extends from a bottom inner face of the bezel 10. A pair of first catches 111 is rightward formed in the front of the arms 11. Another pair of catches 14 upwardly extends from an upper inner face of the bezel 10. A plurality of pillars 131 is inwardly formed from inner faces of the bezel 10 around circumferential edges.

Figure 2:
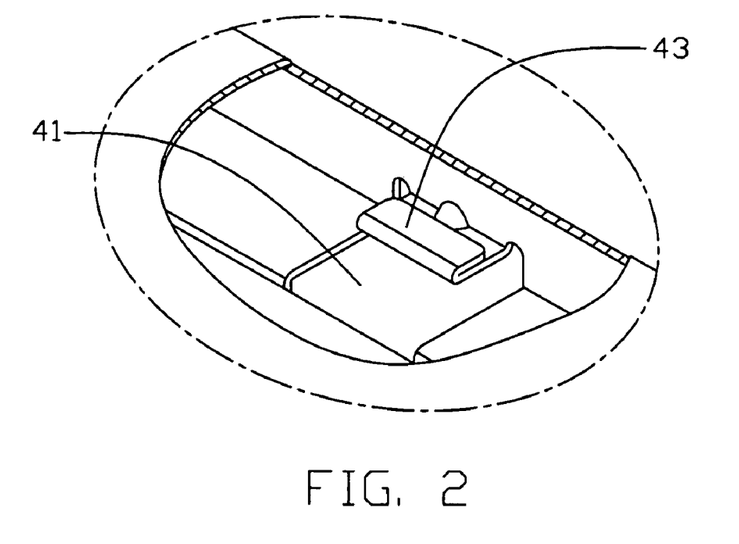
FIG. 2 is an enlarged view of a circled portion II of FIG. 1.
Figure 5:
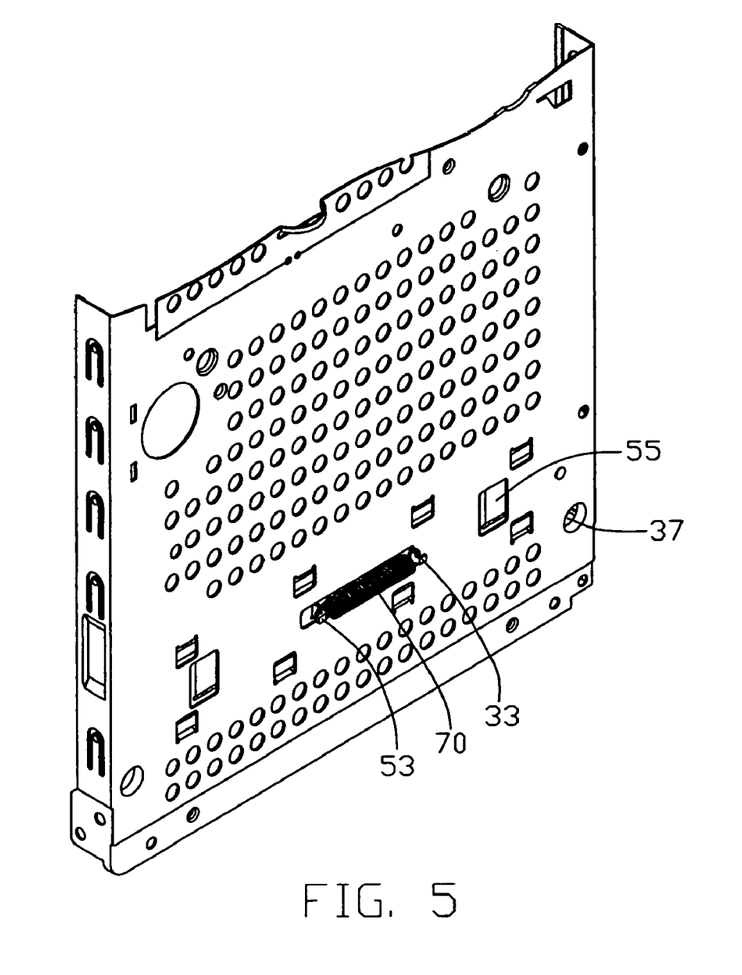
FIG. 5 is similar to FIG. 4, but viewed from another aspect.
Figure 6:
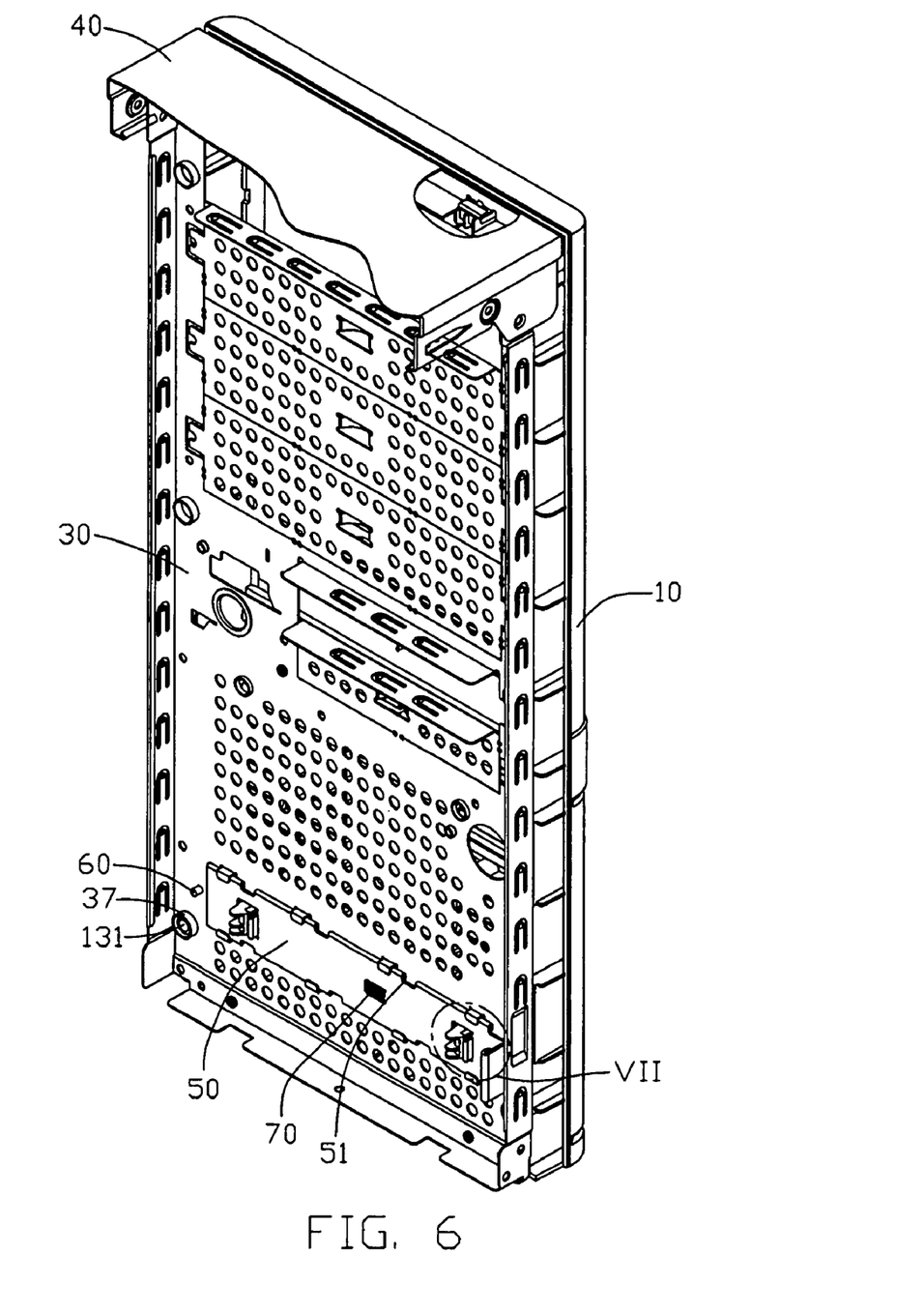
FIG. 6 is an assembled view of FIG. 1, and showing the latch in a unlocked state.
Figure 7:
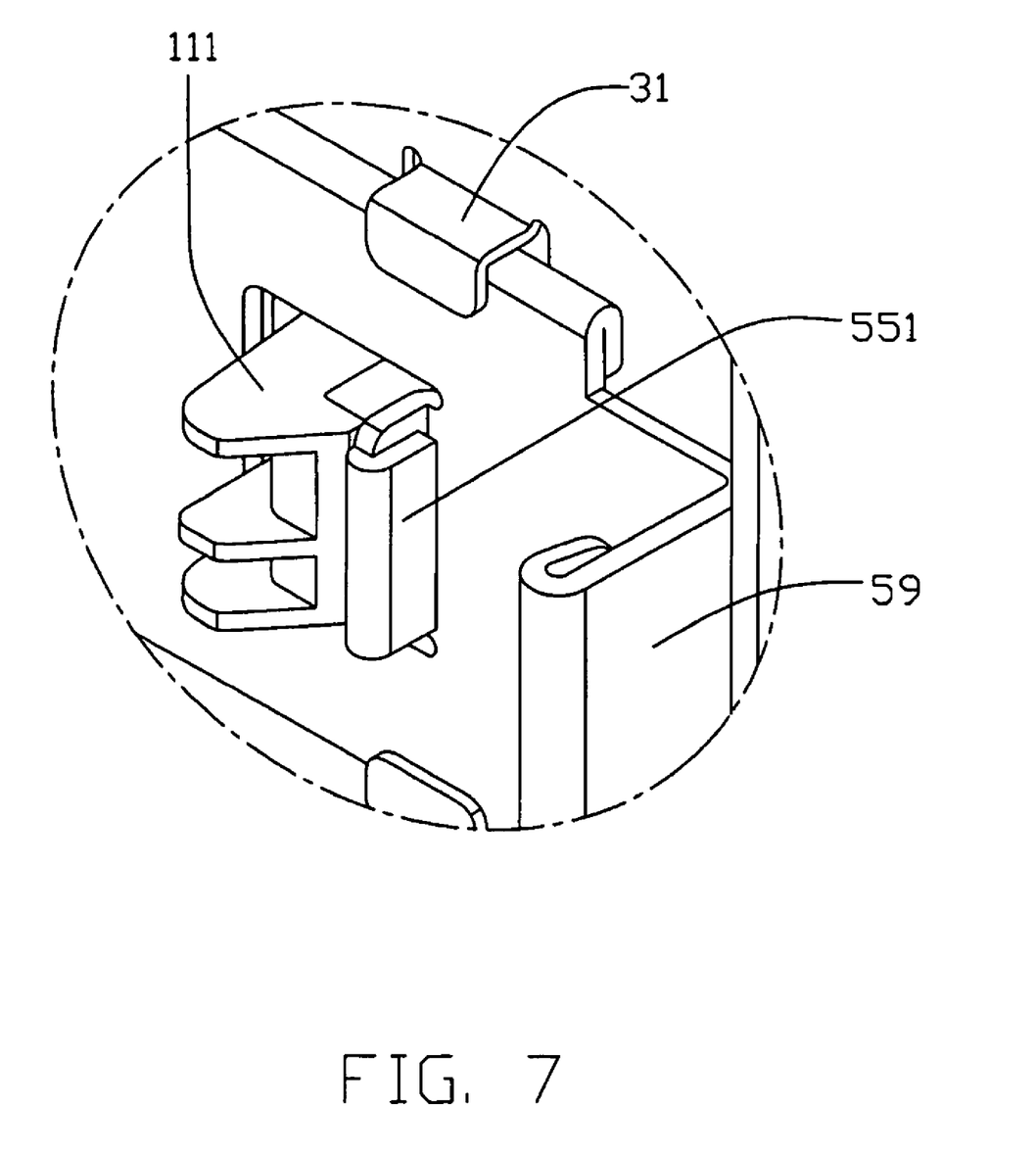
FIG. 7 is an enlarged view of a circled portion VII of FIG. 6.
Figure 8:
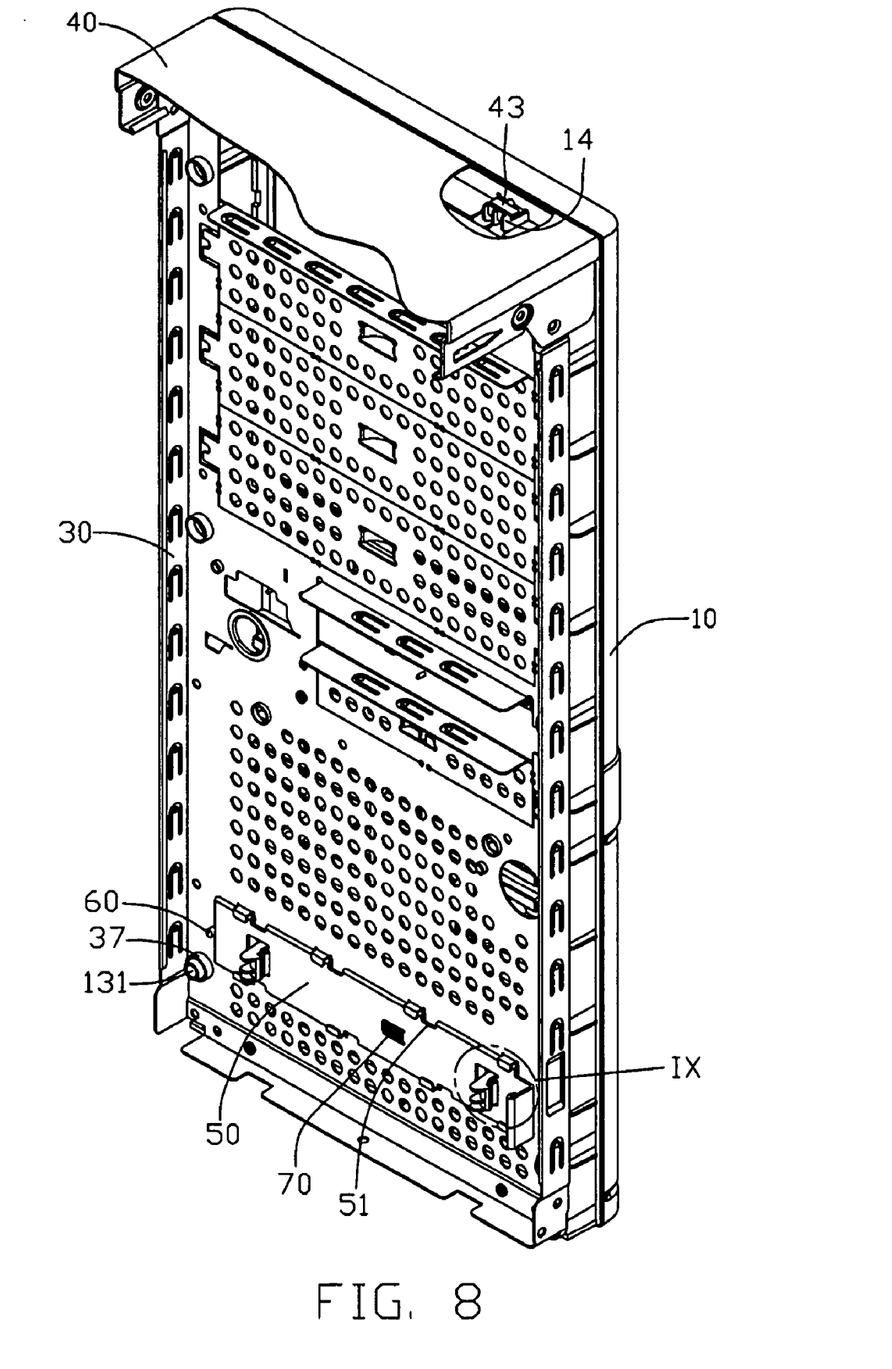
FIG. 8 is similar to FIG. 5, but showing the latch in an locked state.
Figure 9:
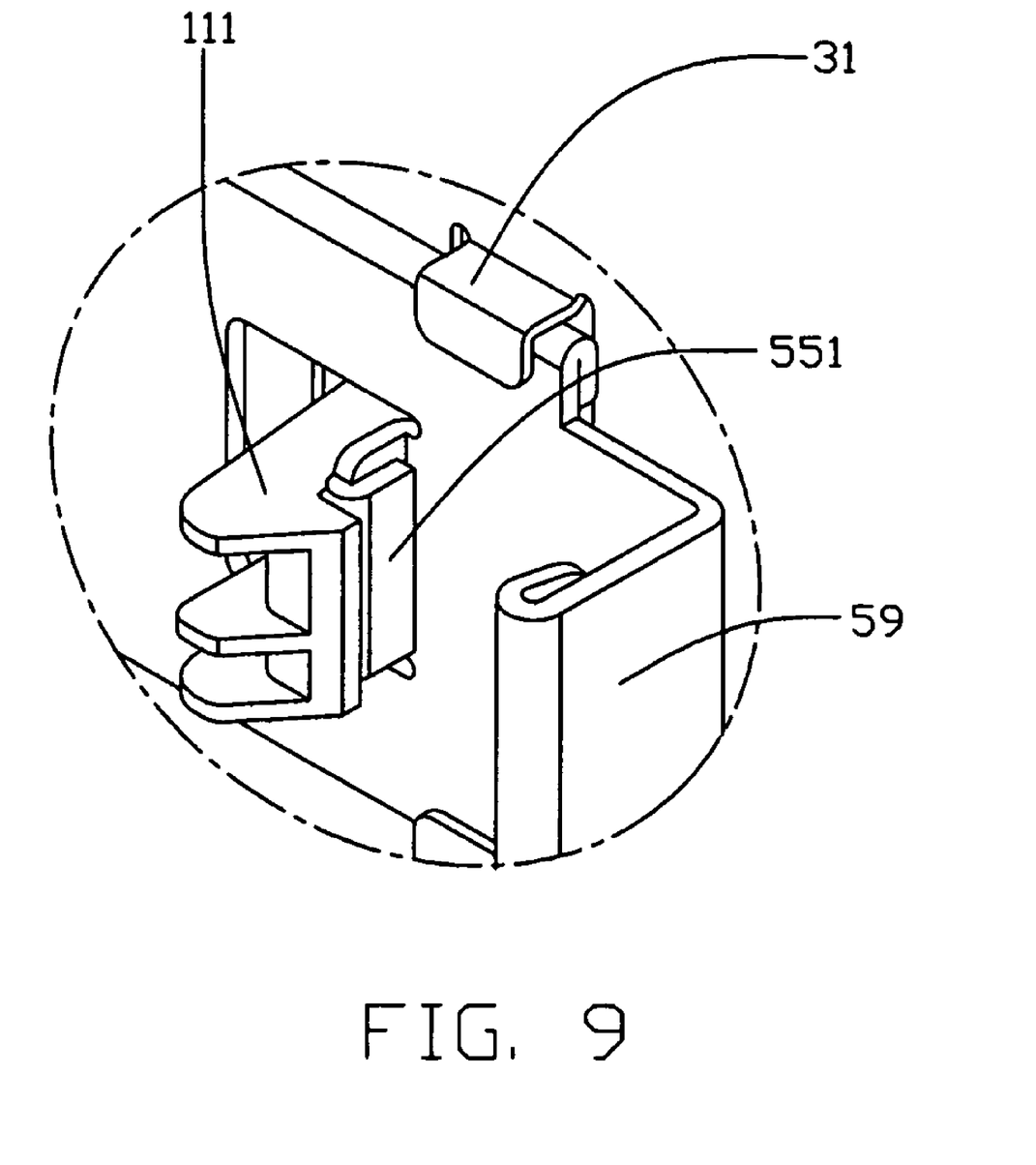
FIG. 9 is an enlarged view of a circled portion IX of FIG. 8.

Referring also to FIG. 2, the chassis 20 comprises a front panel 30, and a top cover 40. The front panel 30 defines a longwise slit 32 in a bottom portion therein longwise. A pair of first slots 35 is defined in the front panel 30 adjacent two ends of the slit 32, for extending through the first latches 111 of the bezel 10. A plurality of hooks 31 is formed on the front panel 30 along each of the opposite longwise sides of the slit 32. A plurality of seats 37 with through holes (not labeled) extends inwardly from the front panel 30, corresponding to the pillars 131 of the bezel 10. An aperture 39 is defined in a bottom portion of the front panel 30 adjacent a left one of the slots 35, engaging with the locator 60 therein for preventing the latch 50 disengaging from the front panel 30. A pair of openings 41 is defined in a top flange (not labeled) of the front panel 30. A first tab 43 extends horizontally and over each opening 41, for engaging with corresponding second catch 14 of the bezel 10. Referring also to FIG. 5, a first clasp 33 extends perpendicularly at a vertical edge of the slit 32.

Figure 3:
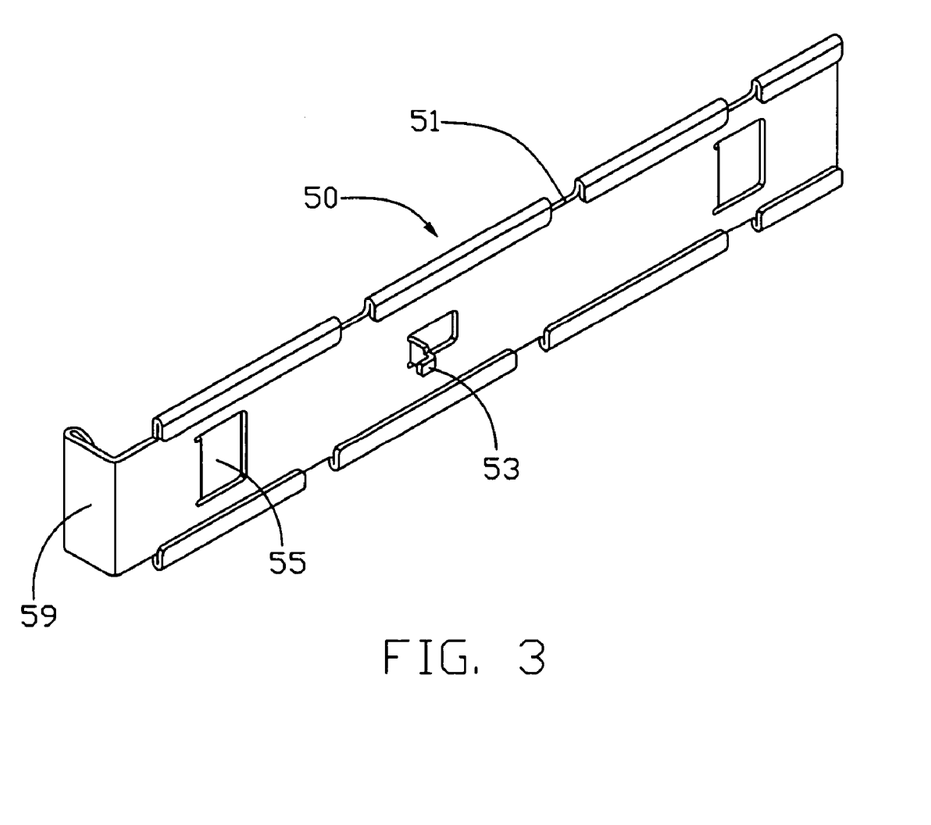
FIG. 3 is an enlarge isometric view of the latch of FIG. 1, but viewed from another aspect.

The latch 50 has an L-shaped configuration, and is slidably attached to the front panel 30. The latch 50 comprises a plate 51, and a handle 59 extending perpendicularly at one distal end of the plate 51. A plurality of notches 52 is defined in an upper and a lower portion of the plate 51, corresponding to the hooks 31 of the bezel 10. A pair of second slots 55 is defined in the plate 51, corresponding to the first slots 35 of the front panel 30. A second tab 551 extends perpendicularly at a right edge of each second slot 55, for engaging with the first catches 111 of the bezel 10. Referring also to FIG. 3, a second clasp 53 extends perpendicularly from the plate 51 in an opposite direction to the second tabs 551, corresponding to the first clasp 33 of the front panel 30 to fix the resilient member 70 therebetween.

Figure 4:
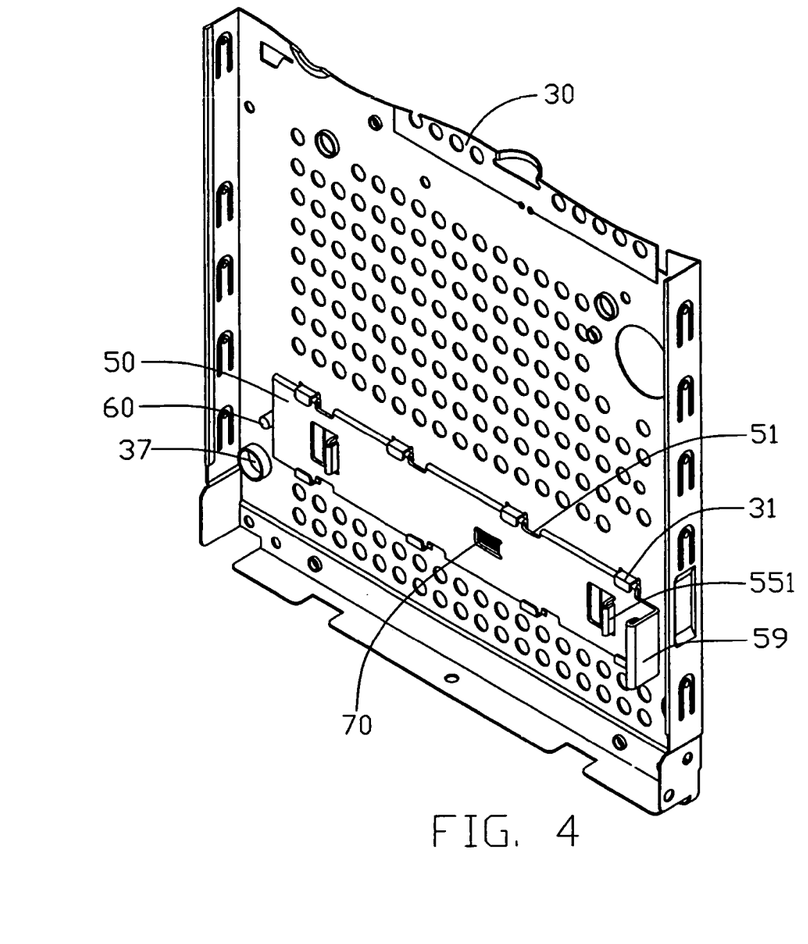
FIG. 4 is an assembled view of the front panel and the latch of FIG. 1, with part of the front panel cut away.

Referring to FIGS. 4 and 5, in assembly, the hooks 31 of the front panel 30 engage in the notches 52 of the latch 50 and the second clasp 53 of the latch 50 is extended through the slit 32. The resilient member 70 is disposed between the second clasp 53 and the first clasp 33 of the front panel 30. The latch 50 is slidably and resiliently attached to inner surfaces of the front panel 30. Then the locator 60 is rivetly fixed in the aperture 39 of the front panel 30, to locate the latch 50 on the front panel 30.

Referring also to FIGS. 6–9, the bezel 10 is attached to the assembling front panel 30. The second catches 14 are extended through the opening 41 of the front panel 30 and engage with first tabs 43. The first catches 111 are then extended through the first slots 35 of the front panel 30 and the second slots 55 of the latch 50 to engage with the second tabs 551 of the latch 50. During the latter operation, the first catches 111 abut the second tabs 551 and apply a rightward force on the latch 50. The resilient member 70 is enlongated and the latch 50 moves rightwardly. After the first catches 111 ride over the second tabs 551 and the resilient member 70 rebounds, the first catches 111 engage with the second tabs 551. Simultaneously, the pillars 131 of the bezel 10 are extended through the seat 37 of the front panel 30. Thus, the bezel 10 is securely attached to the front panel 30 by the latch 50 inside of the chassis 20.

In disassembly, the latch 50 is moved rightward via the handle 59 inside of the chassis 20 to disengage the first catches 111 of the bezel 10 from the second tabs 551 of the latch 50. The bezel 10 is easily detached from the front panel 30 of the chassis 20.

While the present invention has been illustrated by the description of the preferred embodiment thereof, and while the preferred embodiment has been described in considerable detail, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative example shown and described.

What is claimed is:

1. A bezel mounting assembly comprising:
a front panel comprising a pair of first slots, and a plurality of hooks extending inwardly therefrom along said first slots;
a bezel attached on the front panel and comprising a pair of first catches extending therefrom; and
a latch resiliently moving between the hooks of the front panel, the latch comprising a pair of second slots, and a pair of tabs extending therefrom beside the second slots;
wherein in assembling the bezel to the front panel, the first catches are extended through the first and the second slots to abut and apply a pushing force on the tabs, thereby the latch moving along the front panel, the first catches engage with the tabs so that the bezel is secured to the front panel.

2. The bezel mounting assembly as claimed in claim 1, wherein the front panel further comprises a first clasp extending therefrom, the latch further comprises a second clasp extending therefrom, a resilient member is disposed between the first and the second clasps.

3. The bezel mounting assembly as claimed in claim 1, wherein the bezel further comprises a plurality of pillars extending inwardly, and the front panel comprises a plurality of seats defining through holes therein corresponding to the pillars.

4. The bezel mounting assembly as claimed in claim 1, wherein the latch comprises a plate, and a handle extending perpendicularly from the plate.

5. The bezel mounting assembly as claimed in claim 4, wherein the plate defines a plurality of notches in an upper portion and a lower portion, corresponding to the hooks of the front panel.

6. The bezel mounting assembly as claimed in claim 1, wherein the bezel further comprises a pair of second catches in a top portion thereof, the front panel further comprises a pair of tabs corresponding to the second catches.

7. An electronic device comprising:
a chassis enclosing said electronic device, comprising a front panel;
a bezel attachable to said front panel in order to cover said front panel from an outside of said chassis, said bezel having at least one first catch extendable through said front panel into said chassis; and
a latch movably attached to said front panel in said chassis and defining at least one first tab corresponding to said at least one first catch, said latch resiliently movable along a predetermined direction parallel to said front panel between a first position where said at least one first catch is capable of extending toward said latch around said at least one first tab, and a second position where said at least one first catch is capable of being engaged with said at least one first tab in case that said at least one first catch extends toward said latch; wherein
said latch is in a trend of resiliently moving toward said second position along said predetermined direction in case tat said latch is forced to move to said first position along a reverse direction to said predetermined direction.

8. The electronic device as claimed in claim 7, wherein said bezel comprises at least one second catch located far away from said at least one first catch and resiliently engagable with at least one second tab formed in said front panel.

9. The electronic device as claimed in claim 7, wherein said bezel further comprises a plurality of pillars extending inwardly, and said front panel comprises a plurality of seats defining through holes therein corresponding to said pillars.

10. The electronic device as claimed in claim 7, wherein said front panel further comprises a first clasp extending therefrom, and said latch further comprises a second clasp extending therefrom, a resilient member is disposed between said first and second clasps.

11. The electronic device as claimed in claim 7, wherein said latch comprises a plate, and a handle extending perpendicularly from said plate.

12. The electronic device as claimed in claim 11, wherein said plate defines a plurality of notches in an upper portion and a lower portion thereof, and said front panel has a plurality hooks from an inner side thereof corresponding to said plurality of notches for facilitating attachment of said latch to said front panel.

13. A bezel mounting assembly comprising:
a front panel;
a bezel attached to an outer surface of the front panel, the bezel comprising at least one catch extending inwardly therefrom, said catch forming a slanted end;
a latch movably attached to an inner surface of the front panel, at least one protruding tab inwardly formed from the latch, a resilient member connecting the latch and the front panel;
wherein when the bezel is vertically attached to the front panel, said catch extends through the front panel and the slanted end exerts a horizontal force to the latch to move the latch and deform the resilient member, then said catch snappingly engages the latch.

14. The bezel mounting assembly as described in claim 13, wherein the front panel defines at least one slot for extension of said catch.

15. The bezel mounting assembly as described in claim 13, wherein at least one protruding tab is formed from the latch for engaging with said catch.

16. The bezel mounting assembly as described in claim 13, wherein a handle is formed inwardly from the latch.

17. The bezel mounting assembly as described in claim 13, wherein a pair of hooks is stamped inwardly from the front panel, defining a slideway therebetween for sliding the latch.

* * * * *